United States Patent [19]

Shiogai et al.

[11] Patent Number: 5,302,329
[45] Date of Patent: Apr. 12, 1994

[54] PROCESS FOR PRODUCING β-SIALON BASED SINTERED BODIES

[75] Inventors: Tatsuya Shiogai; Yoshitsugu Nishi, both of Chiba; Chitake Yamagishi, Tokyo, all of Japan

[73] Assignee: Nihon Cement Co., Ltd., Tokyo, Japan

[21] Appl. No.: 775,946

[22] PCT Filed: Apr. 28, 1989

[86] PCT No.: PCT/JP89/00452

§ 371 Date: Oct. 21, 1991

§ 102(e) Date: Oct. 21, 1991

[51] Int. Cl.$^5$ .............................................. C04B 35/58
[52] U.S. Cl. ........................................ 264/65; 501/89; 501/93; 501/98
[58] Field of Search .................... 264/65; 501/89, 93, 501/98

[56] References Cited

U.S. PATENT DOCUMENTS

| | | | |
|---|---|---|---|
| 3,895,219 | 7/1975 | Richerson | 264/63 |
| 3,903,230 | 9/1975 | Kamigaito | 264/65 |
| 4,066,468 | 1/1978 | Kamigaito | 264/65 |
| 4,365,022 | 12/1982 | Tabata | 501/97 |
| 4,506,021 | 3/1985 | Jack | 501/98 |

FOREIGN PATENT DOCUMENTS

| | | |
|---|---|---|
| 53-17631 | 6/1978 | Japan . |
| 58-19630 | 4/1983 | Japan . |
| 62-15505 | 4/1987 | Japan . |
| 62-41193 | 9/1987 | Japan . |
| 63-43346 | 8/1988 | Japan . |

OTHER PUBLICATIONS

Abstract of Japanese Pat. Pub. Disclosure No. 73472/1984.
N. E. Cother et al, "The Development of Syalon Ceramics and their Engineering Applications, " Trans. J. Br. Ceram. Soc. 1982, p. 141.

*Primary Examiner*—James Derrington
*Attorney, Agent, or Firm*—Wolf, Greenfield & Sacks

[57] ABSTRACT

The present invention is a process for producing β-sialon based sintered bodies having a fracture toughness ($K_{IC}$) of at least 6.5 MPam$^{\frac{1}{2}}$.

The process comprises preparing a feed that consists of 0.5-20 wt % of a sintering aid (e.g. MgO) with an average particle size of no more than 5.0 μm, 3-40 wt % of an additive (e.g. SiC) with an average particle size of no more than 5.0 μm, with the remainder being a β-sialon powder having an average particle size of no more than 2.0 μm, wet mixing the individual feeds to form a slurry, drying the slurry and sintering the dried slurry.

10 Claims, No Drawings

PROCESS FOR PRODUCING β-SIALON BASED SINTERED BODIES

DESCRIPTION

1. Technical Field

This invention relates to a process for producing β-sialon based sintered bodies having significantly high values of fracture toughness (which is hereunder abbreviated as $K_{IC}$) using three starting materials, i.e., a β-sialon powder, a sintering aid such as MgO and an additive such as SiC and by specifying such factors as the fineness of the individual starting materials and their mixing proportions.

2. Background Art

Sialon is known to occur in many forms such as α-, β-, o'-, x- and polycrystalline types depending upon the composition and crystalline form. The β-sialon which is to be used in the present invention as a starting material is represented by the chemical formula $Si_{6-z}Al_zO_zN_{8-z}$ ($0<z\leq 4.2$). Sintered bodies of β-sialon have many advantages such as high strength at both room temperature and high temperatures, high resistance to oxidation at high temperatures and high resistance to erosion by molten metals and, therefore, they are used in machine parts such as engines and gas turbines, various refractories and cutting tools.

There are two basic processes for producing β-sialon sintered bodies. One method is well established and has been studied for many years; starting materials such as $Al_2O_3$, $SiO_2$, $Si_3N_4$ and AlN are appropriately mixed and immediately sintered (this method is generally referred to as the reactive sintering method). Many patents have issued on this method as exemplified by U.S. Pat. Nos. 4,066,468, 4,506,021 and Japanese Patent Publication No. 1763/1978. The other method comprises the following steps: synthesizing a β-sialon powder by firing the premix that has been prepared in the process of the reactive sintering method, mixing the powder with a sintering aid such as MgO or $Y_2O_3$ and either hot pressing the resulting mixture or shaping it into a compact which is then subjected to normal sintering. This second method is hereinafter referred to as the powder sintering method for convenience' sake.

With a view to making the β-sialon sintered bodies more suitable for use in the aforementioned applications, active studies are being made to develop composite sintered bodies that are provided with enhanced wear resistance and toughness by incorporating other compounds. For instance, Journal of the Ceramic Society of Japan, Vol. 95(4), pp. 450–452, 1987 describes a modified reactive sintering method, in which starting materials, i.e., α-$Si_3N_4$, α-$Al_2O_3$, AlN and SiC, are mixed and hot pressed to produce a sintered body composed of β-sialon and SiC (50 wt %). Modified powder sintering methods are also described in several patents. According to the examples described in Japanese Patent Publication Nos. 15505/1987 and 41193/1987, a β-sialon powder having a maximum particle size of 60 mesh (250 μm) is mixed with appropriate amounts of powders on a submicron order such as $Y_2O_3$, $ZrO_2$, TiC, TiN and TiCN and the resulting mixture is hot pressed in a nitrogen atmosphere at 1750° C. to produce a sintered body. According to the examples of Japanese Patent Public Disclosure No. 73472/1984, a β-sialon powder having an average particle size of 1.0 μm is mixed with a sintering aid ($Y_2O_3$ powder and/or MgO powder) and an additive [(Ti,W)CN compound] and the resulting mixture is shaped into a powder compact at a pressure of 1000 kgf/cm², with the compact being then subjected to normal sintering in a nitrogen atmosphere at 1600°–1750° C. to produce a sintered body.

However, most of the sintered bodies produced by those conventional methods have $K_{IC}$ values lower than 6.0 MPam$^{\frac{1}{2}}$, so when they are used in the aforementioned applications, particularly in sliding machine parts, surface flaws develop, which will grow to cracks and frequently lead to the destruction of the machine part.

Recognizing the need to solve these problems, the present inventors made studies on the production of sintered bodies with a view to improving the $K_{IC}$ values of sintered bodies produced by the conventional methods.

OBJECT OF THE INVENTION

An object of the present invention is to provide a process that is capable of producing β-sialon based sintered bodies having $K_{IC}$ values of at least 6.5 MPam$^{\frac{1}{2}}$.

SUMMARY OF THE INVENTION

The present invention relates to an improvement of the powder sintering method. In addition to a β-sialon powder and a sintering aid, the method of the present invention uses an additive as a third starting material and the particle sizes of the three starting materials and their mixing proportions are strictly controlled. Stated more specifically, the average particle sizes of the three starting materials are such that β-sialon powder is no more than 2.0 μm in size, with the sintering aid and the additive each being no more than 5.0 μm in size. The sintering aid is at least one compound selected from among MgO, $Y_2O_3$ and a rare earth oxide, and the additive is either at least one compound selected from among SiC, $B_4C$ and BN, or said at least one compound $TiB_2$ and/or TiC. The mixing proportions of these starting materials are such that the sintering aid is present in an amount of 0.5–20 wt % and the additive in an amount of 3–40 wt %, with the remainder being β-sialon. In short, the method of the present invention employs the thus strictly controlled starting materials, which are wet mixed in the prescribed proportions to prepare a slurry which is dried and either hot pressed or subjected to normal sintering after forming a shaped part (powder compact) by pressure molding the dried slurry (mixture) to desired shape, whereby a β-sialon based sintered body having a $K_{IC}$ value of at least 6.5 MPam$^{\frac{1}{2}}$ is produced.

DETAILED DESCRIPTION OF THE INVENTION

The present inventors noted the powder sintering method because it has the following advantages over the reactive sintering method: (1) a uniform mixture of starting materials can be easily obtained, so sintered bodies of high reliability can be produced; and (2) a normal sintering technique can be adopted and this enables the production of complexly shaped sintered bodies. As another advantage, (3) the aforementioned compounds are already commercially available in various degrees of fineness, so the step of synthesizing the necessary starting materials can be eliminated by selecting suitable compounds.

The essential elements of the present invention are individually described below.

The β-sialon powder to be used in the present invention may be synthesized by any method. Hence, commercial β-sialon powders may be used as long as they have the prescribed fineness. Alternatively, β-sialon powders having the prescribed fineness may be synthesized by manufacturers themselves.

As defined by its chemical formula, the powder of β-sialon is a solid solution wherein z is in the range of 0–4.2. If the β-sialon powder alone is merely sintered, sintered bodies of comparatively high density can be produced on the condition of $z=2-4$. However, if $z<2$, only a small amount of liquid phase will form during sintering, so that the resulting sintered body tends to be porous and has low $K_{IC}$. However, in accordance with the present invention, the sintering aid insures the formation of a liquid phase in an adequate amount and, at the same time, the additive contributes to the densification of sintered bodies. Hence, there is no particular limitation on the range of z but the additive will prove significantly effective in enhancing $K_{IC}$ if $z<2$.

The reason for using the sintering aid is described below. β-sialon having a (Si,Al)—(O,N) bond, is highly prone to form a covalent bond and has a low self-diffusion coefficient, so a smaller amount of a liquid phase will form during sintering. Hence, β-sialon is a compound which, like $Si_3N_4$, is not readily sinterable. It is for this reason that the use of the sintering aid is indispensable to the sintering step. During sintering, the sintering aid forms a liquid phase and undergoes grain boundary diffusion between particles of β-sialon. After cooling, the sintering aid forms a glassy phase which remains between particles of β-sialon and serves as the binding phase that contributes higher density and toughness to the final sintered body.

As the sintering aid having these effects, the present invention adopts at least one compound selected from among MgO, $Y_2O_3$ and rare earth oxides. These oxides are known as sintering aids in the ceramics industry and they are also essential in the present invention. Exemplary rare earth oxides include $CeO_2$, $Nd_2O_3$, $Sm_2O_3$ and $La_2O_3$. Preferred sintering aids are MgO and/or $Y_2O_3$.

The additive serves to impart toughness to β-sialon based sintered bodies and, as already-mentioned above, its effectiveness is particularly great if the powder of β-sialon is in the range of $z<2$. However, the mechanism behind the effect of the additive on toughness is not completely clear. In the present invention, either at least one compound selected from among SiC, $B_4C$ and BN, or said at least one compound and $TiB_2$ and/or TiC is used as the additive and preferred compounds are SiC and/or $B_4C$.

The fineness of the starting materials is particularly important to the present invention as discussed below. It is essential for the present invention that the β-sialon powder, the sintering aid and the additive have average particle sizes of no more than 2.0 μm, 5.0 μm and 5.0 μm, respectively. If any one of the starting materials used have average particle sizes exceeding the prescribed values, the starting materials will not be uniformly dispersed even if they are wet mixed for a prolonged time, so that local inhomogeneity will occur to produce a sintered body that has low toughness and that is low in strength on account of the presence of coarse particles. In particular, the use of the additive having an average particle size exceeding 5.0 μm should be avoided, since such an additive is scarcely effective in improving the value of $K_{IC}$. Desirable average particle sizes are as follows: no more than 1.0 μm for the β-sialon powder and no more than 2.0 μm for each of the sintering aid and the additive.

The mixing proportions of the starting materials are discussed below. The sintering aid is used in an amount of 0.5–20 wt % and the additive in an amount of 3–40 wt. %, with the remainder being the β-sialon powder. If the amount of the sintering aid is less than 0.5 wt %, the liquid phase which is the driving force for sintering will form in such a small amount that the intended effect of the aid is not achieved. If the amount of the additive is less than 3 wt %, it is ineffective in enhancing the value of $K_{IC}$. On the other hand, if the amount of the sintering aid exceeds 20 wt %, the glassy phase forming at grain boundaries will become excessive and the values of $K_{IC}$ and strength (particularly at high temperatures) will decrease rather than increase. If the amount of the additive exceeds 40 wt %, the mixture of the starting materials will not be readily sintered and an uneconomically long time is required to complete the sintering process. Preferred mixing proportions are 3–15 wt % for the sintering aid and 7–35 wt % for the additive.

The production of a sintered body proceeds as follows. The starting materials having the average particle sizes specified above are weighed in the prescribed proportions and are thoroughly wet mixed in the usual manner to prepare a slurry. During mixing, alcohol (e.g. isopropyl alcohol) or n-hexane is used. The slurry is dried with a dryer. The dried slurry (mixture) is hot pressed in a nitrogen atmosphere under a pressure of at least 50 kgf/cm² at a temperature of 1700°–1850° C. Alternatively, the dried slurry is pressed at 100 kgf/cm² to make a shaped part of a desired shape (powder compact), which is then subjected to normal sintering in a nitrogen atmosphere at 1720°–1850° C. By either method, a β-sialon based sintered body having a $K_{IC}$ of at least 6.5 MPam$^{\frac{1}{2}}$ can be produced. Furthermore, a normal sintering technique is more preferable than a hot pressed sintering technique, because the former enables the production of complex shaped sintered bodies and also, the mass production thereof.

EXAMPLE 1

Starting materials having various average particles sizes as shown in Table 1 were mixed and the $K_{IC}$ values of the sintered bodies produced from the resulting mixtures were measured.

Feeds each consisting of a β-sialon powder (z=0.5), sintering aids and additives in respective amounts of 65 wt %, 10 wt % and 25 wt % were charged into a plastic pot mill together with isopropyl alcohol and the individual feeds were mixed for 24 h to prepare slurries, which were then dried. In Run Nos. 4 and 5, additives SiC and $B_4C$ were incorporated in a weight ratio of 1:1; in Run No. 6, sintering aids $Y_2O_3$, $CeO_2$ and $Nd_2O_3$ were incorporated in a weight ratio of 1:1:1 and additives $B_4C$, $TiB_2$ and TiC were incorporated in a weight ratio of 1:1:1.

Using the dried slurries (mixtures), β-sialon based sintered bodies (test pieces) having a diameter of 50 mm and a thickness of 5 mm were produced by either one of the following two sintering methods: hot pressing in a nitrogen atmosphere for 60 min under 230 kgf/cm² at 1780° C., or pressing the dried slurry into a powder compact at a pressure of 500 kgf/cm², followed by normal sintering in a nitrogen atmosphere at 1780° C. for 90 min.

The $K_{IC}$ values of the respective sintered bodies were measured by the Indentation method and the results are also shown in Table 1.

TABLE 1

| Run No. | β-sialon powder | Average particle size, μm | | | | | | | | Sintering method | $K_{IC}$, MPam$^{\frac{1}{2}}$ | Remarks |
|---|---|---|---|---|---|---|---|---|---|---|---|---|
| | | sintering aid | | | | additive | | | | | | |
| | | MgO | Y$_2$O$_3$ | CeO$_2$ | Nd$_2$O$_3$ | SiC | B$_4$C | TiB$_2$ | TiC | | | |
| 1 | 0.8 | 0.7 | — | — | — | 0.3 | — | — | — | normal sintering | 6.7 | |
| 2 | 0.8 | — | 0.4 | — | — | 0.3 | — | — | — | " | 6.8 | |
| 3 | 0.8 | — | 1.7 | — | — | 0.3 | — | — | — | " | 7.1 | |
| 4 | 0.8 | — | 1.7 | — | — | 0.3 | 1.3 | — | — | " | 7.3 | |
| 5 | 0.8 | — | 1.7 | — | — | 0.3 | 1.3 | — | — | hot press | 7.0 | |
| 6 | 0.8 | — | 1.7 | 3.9 | 2.9 | — | 1.3 | 1.9 | 3.7 | normal sintering | 7.1 | |
| 7 | 0.8 | — | 6.7 | — | — | 0.3 | — | — | — | " | 5.3 | comparison |
| 8 | 0.8 | — | 6.7 | — | — | 7.7 | — | — | — | " | 5.2 | " |
| 9 | 2.5 | — | 1.7 | — | — | 0.3 | — | — | — | " | 4.9 | " |

EXAMPLE 2

Sintered bodies were produced from mixtures that were mixed in various proportions as shown in Table 2 and their $K_{IC}$ values were measured.

A β-sialon powder having an average particle size of 0.8 μm (z in the chemical formula was 0.5 except for Run No. 19 in which z=3.5), Y$_2$O$_3$ having an average particle size of 1.7 μm and SiC having an average particle size of 0.3 μm were mixed in the proportions shown in Table 2 to prepare individual feeds. Using these feeds, β-sialon based sintered bodies were produced in accordance with the procedure described in Example 1. The results of $K_{IC}$ measurements on the sintered bodies are also shown in Table 2.

TABLE 2

| Run No. | Proportions, wt % | | | Sintering method | $K_{IC}$, MPam$^{\frac{1}{2}}$ | Remarks |
|---|---|---|---|---|---|---|
| | β-sialon powder | Y$_2$O$_3$ | SiC | | | |
| 10 | 77 | 3 | 20 | normal sintering | 7.2 | |
| 11 | 85 | 10 | 3 | normal sintering | 6.7 | |
| 12 | 75 | 10 | 15 | normal sintering | 6.8 | |
| 13 | 55 | 10 | 35 | normal sintering | 7.3 | |
| 14 | 70 | 15 | 15 | normal sintering | 6.9 | |
| 15 | 45 | 10 | 45 | normal sintering | — | comparison sintering impossible |
| 16 | 89 | 10 | 1 | normal sintering | 5.6 | comparison |
| 17 | 55 | 25 | 20 | normal sintering | 5.1 | " |
| 18 | 79.9 | 0.1 | 20 | normal sintering | 4.8 | " |
| 19 | 70 | 10 | 20 | normal sintering | 6.5 | z = 3.5 |

INDUSTRIAL APPLICABILITY

As described on the foregoing pages, β-sialon based sintered bodies obtained by the process of the present invention have extremely high values of fracture toughness, so they are suitable for use in various applications including machine parts such as engines and gas turbines, various refractories and cutting tools.

I claim:

1. A process for producing a beta-sialon based sintered body having a fracture toughness of at least 6.5 MPam$^{\frac{1}{2}}$ using as starting materials beta-sialon powder ($Si_{6-z}Al_zO_zN_{8-z}$ where $0 < z < 4.2$) having an average particle size of no more than 0.8 μm, a sintering aid comprising an oxide, the sintering aid having an average particle size of no more than 5.0 μm, and an additive that has an average particle size of no more than 5.0 μm, said additive comprising a compound selected from the group consisting of the compounds SiC, B$_4$C, and BN, one of said compounds and TiB$_2$, and one of said compounds and TiC, the process comprising the steps of:

wet mixing the starting materials to form a slurry, the starting materials being in such proportion that the sintering aid comprises 0.5-20 wt % and the additive comprises 3-40 wt %, the remainder being the beta-sialon powder, drying the resulting slurry, and sintering the dried slurry.

2. A process according to claim 1 wherein suffix z in the chemical formula of the β-sialon powder is no more than 2.0.

3. A process according to claim 1 wherein the sintering aid is at least one compound selected from the group consisting of MgO, Y$_2$O$_3$ and a rare earth oxide.

4. A process according to claim 1 wherein each of the sintering aid and the additive has an average particle size of no more than 2.0 μm.

5. A process according to claim 1 wherein the sintering aid is MgO and/or Y$_2$O$_3$.

6. A process according to claim 1 wherein the additive is SiC and/or B$_4$C.

7. A process according to claim 1 wherein the sintering aid is incorporated in an amount of 3-15 wt %.

8. A process according to claim 1 wherein the additive is incorporated in amount of 7-35 wt %.

9. A process according to claim 1 wherein isopropyl alcohol or n-hexane is used as a liquid in the wet mixing step.

10. A process according to claim 1 wherein the dried slurry is pressed into a powder compact under 100 kgf/cm$^2$ or higher and the resulting compact is subjected to normal sintering in a nitrogen atmosphere at a temperature of

* * * * *